Sept. 1, 1964   MITSUHIRO KISHIDA   3,146,518
METHOD OF MAKING A CONDENSER-TYPE TERMINAL BUSHING
Filed April 17, 1961
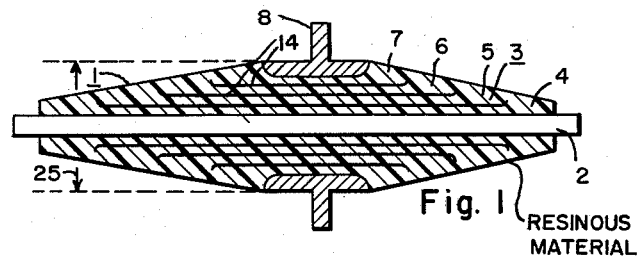
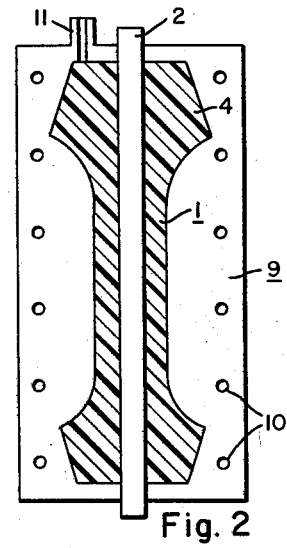
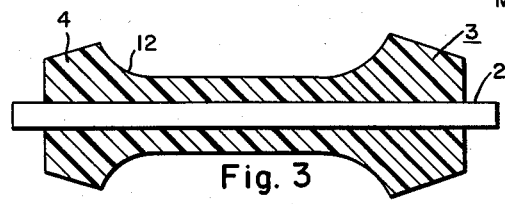
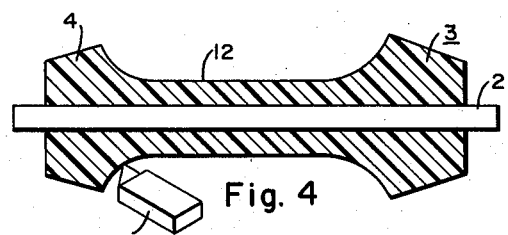
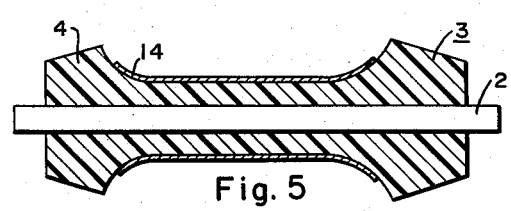
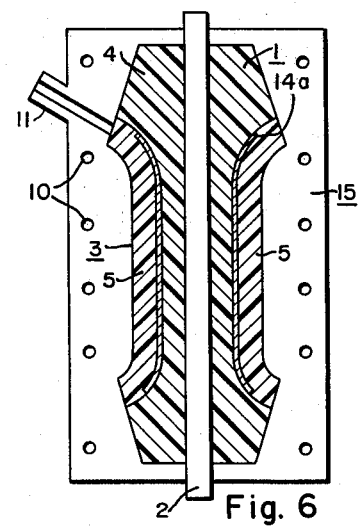
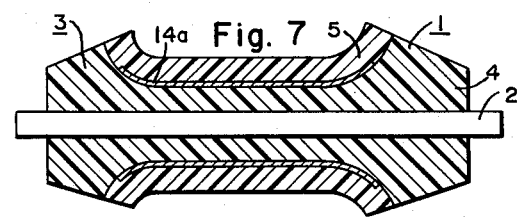
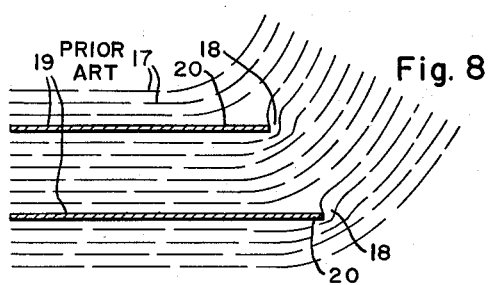
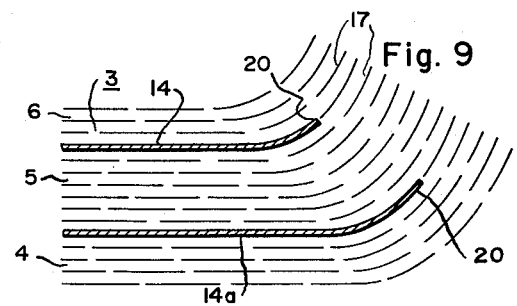

United States Patent Office 3,146,518
Patented Sept. 1, 1964

3,146,518
METHOD OF MAKING A CONDENSER-TYPE
TERMINAL BUSHING
Mitsuhiro Kishida, Amagasaki, Japan, assignor to Mitsubishi Denki Kabushiki Kaisha, Tokyo, Japan, a company of Japan
Filed Apr. 17, 1961, Ser. No. 103,324
2 Claims. (Cl. 29—155.5)

This invention relates to condenser-bushing constructions in general, and, more particularly, to condenser-bushing constructions fabricated from molded resinous material.

A general object of the present invention is to provide an improved condenser-type terminal-bushing construction.

A more specific object of the present invention is to facilitate and to expedite the manufacture of condenser-type terminal bushings utilizing a laminated molded resinous layer construction.

Another object of the present invention is to provide an improved condenser-type terminal-bushing construction in which the condenser elements have an improved configuration.

Still a further object of the present invention is to provide an improved condenser-type terminal bushing of minimum overall dimensions.

Yet a further object of the present invention is to provide an improved condenser-type terminal bushing in which the condenser elements have their end portions substantially parallel to the electrical equi-potential lines of the terminal bushing.

Further objects and advantages will readily become apparent upon reading the following specification, taken in conjunction with the drawing, in which:

FIGURE 1 is a vertical longitudinal sectional view taken through a condenser-type terminal bushing embodying features of the present invention;

FIG. 2 is a vertical longitudinal sectional view taken through a terminal bushing constructed in accordance with the teachings of the present invention, showing the molding of the innermost resinous layer;

FIG. 3 is a longitudinal sectional view taken through an initial phase of the terminal-bushing construction, following removal from the mold of FIG. 2;

FIG. 4 shows an optional step, which may be omitted in certain instances, of accurately machining the outer surface of the innermost resinous layer to be parallel to the electrical equi-potential lines of the terminal bushing;

FIG. 5 illustrates an application to the innermost layer of FIGURE 4 of a sprayed, or foil layer constituting a condenser element;

FIG. 6 illustrates a further step in the molding operation of molding about the condenser bushing of FIG. 5 a second outer resinous layer, the figure in addition illustrating the surrounding mold;

FIG. 7 illustrates the condenser bushing of FIGURE 6 following removal from the mold;

FIGURE 8 illustrates the concentration of stress at the ends of the condenser elements of a conventional-type terminal bushing utilizing linearly shaped elements; and, FIGURE 9 illustrates the equi-potential layers and the relation thereto of the ends of the condenser elements of a condenser-type terminal bushing constructed in accordance with the teachings of the present invention.

Referring to the drawings, and more particularly to FIGURE 1 thereof, the reference numeral 1 generally designates a condenser-type terminal bushing constructed in accordance with the teachings of the present invention. Generally, the condenser bushing 1 comprises an axially extending conductor stud 2 surrounded by a laminated condenser body 3. The laminated condenser body 3 includes a plurality of successively molded resinous layers 4–7 molded in a manner hereinafter described.

Encircling the outermost resinous layer 7, and serving to support the terminal bushing 1 in an operative position, is an outer mounting flange assembly 8. As well known by those skilled in the art, the mounting flange assembly 8 may be employed to secure the terminal bushing 1 in an operative position in a transformer tank, or in a circuit-breaker tank, or other location where it is desired to transmit current at relatively high voltage through grounded tank structures.

FIGURE 2 shows an initial step in the construction of the terminal bushing 1. A suitably configured mold 9 is employed. Preferably, the mold 9 is of split construction, as shown. Holes 10 are associated with the mold 9 to secure thereto a companion member, not shown. Collectively, the mold halves form a pouring spout 11 into which a suitable resinous molding compound may be poured and cured. The manner of utilizing a suitable epoxy resin, or a suitable polyester resin is well known by those skilled in the art, and any suitable resinous material, which may be molded, may be utilized.

Following removal from the split mold 9, as illustrated in FIG. 3 of the drawings, it will be noted that the outer surface portion 12 of the innermost resinous layer 4 has a curved configuration at the end portions thereof, as shown. For certain applications, and as an optional step, where accurate molding is not permissible, the machining step, such as illustrated in FIG. 4 of the drawings, employing a suitable cutting tool 13 may be necessitated to form the proper configuration, as hereinafter more fully described.

FIG. 5 shows a subsequent step in the construction of the improved condenser-type terminal bushing. If an accurate mold 9 is available, the step according to FIG. 4 may be omitted, and the terminal bushing of FIG. 3 may be sprayed with a conducting layer of metal 14. The terminal bushing according to FIG. 4 may, following the machining operation, be likewise used in the fabricating step of FIG. 5, namely applying a sprayed conducting layer 14 thereto. As an alternative possibility, a metallic foil layer 14a may be employed, as illustrated in FIG. 6. FIG. 6, in addition, illustrates the molding, utilizing a mold 15 for forming the second resinous layer 5. Again the resinous layer 5 is formed from a suitable epoxy resin, or a polyester resin, or a similar type resinous molding material.

As shown in FIG. 6, the mold 15 is preferably again of the split type, mounting holes 10 again being provided.

FIG. 7 shows the removal of the terminal bushing 1 from the mold 15 of FIG. 6. At this point in the assembly process, a second metallic sprayed coating or a metallic foil layer 14, 14a, may be applied. The terminal bushing 1 is subjected to repeated molding and spraying operations of like type until the requisite number of condenser elements 14, 14a are present. FIG. 1 illustrates the completed terminal bushing. It will be noted that the ends of the condenser element 14, 14a are completely covered by insulating resinous material, and, in addition, has a curved outer configuration as shown.

As indicated above, the present invention is particularly related to molded condenser-bushings suitable for various voltage ratings and having considerably high dielectric strength. If a large terminal bushing is molded as one piece, there results the disadvantage that internal stresses are produced upon curing, and the result is internal cracks in the condenser body. This is conducive to the formation of corona and gradual deterioration of the insulating body.

The present invention contemplates elimination of the foregoing disadvantages. By separate molding steps, and a resulting laminated construction, the usual internal stresses in conventional bushings are avoided. The voltage gradient within the condenser body may be controlled by the use of a plurality of condenser elements 14, 14a, and the insulating body 3 is formed by molding successive layers 4–7, one at a time, by using a suitable molding material, such as epoxy resin or polyester resin, or the like. The molding operation proceeds from the innermost to the outermost layers, as indicated in the figures.

Upon molding each of the insulating layers, a field-controlling condenser element 14, 14a is provided between adjacent layers 4–7 and secured to the associated molded layer by utilizing metal spraying on the surface thereof, or applying a metallic foil to the same.

As described above, the terminal bushing 1 of the present invention includes a laminated insulating layer construction comprising a plurality of insulating layers formed separately. This makes it possible to eliminate internal stresses in the molded insulating bodies upon curing, resulting thereby in the possibility of manufacturing a relatively large terminal bushing free from the foregoing disadvantages, which a conventional molded bushing will possess. Since the successive layers of the insulating material are molded one by one, and since the condenser elements are secured to the surface portions thereof, it is possible to curve or suitably configure the outer extremities of the condenser elements 14, 14a. As a result, the present invention, in part, relates to an electric field-controlling condenser element 14, 14a for use in a molded condenser bushing including a central conductor stud 2. Preferably, the condenser element 14, 14a is of hollow cylindrical shape concentric to the central conductor stud 2 and has the end portions curved in parallel relationship to the electrical equi-potential surfaces 17 with the result that concentration of the electric field on the end portions of the condenser elements is eliminated, and, as a result, the insulating material may be most effectively used.

It is well known that condenser bushings, as conventionally formed by alternately wrapping linearly-shaped insulating strips and metallic condenser layers have the consequent result that the electrode elements, or condenser elements cannot be shaped. For this reason, the shaping of condenser elements has not been considered in the past. A potential distribution about a condenser element used in a conventional-type terminal bushing is such that equipotential surfaces 17 are disposed in a manner, such as illustrated in FIG. 8 of the drawings. As shown, there results a concentration of the electric field 18 on the end portions of the condenser elements 19. In operation, this causes corona discharge on the end portions of the condenser elements 19 to deteriorate the insulating characteristics of the terminal bushing. In order to reduce both the occurrence of corona discharge and the deterioration of the insulating characteristics of the bushing, an insulating material must be used in a sufficient amount to reduce the gradient of potential above what is necessary. This has the disadvantage that the outside diameter of the resulting terminal bushing is considerably increased.

The present invention is based upon the fact, in part, that in the case of a condenser bushing formed by molding, a condenser element 14, 14a may readily be shaped. According to the present invention, the end portions 20 of the condenser elements 14, 14a for controlling the electric field, and consequently the potential gradient within the condenser body, may be curved to be substantially parallel to the corresponding electrical equi-potential surfaces 17, as shown in FIG. 9. In this way, the electrical potential about the end portions 20 of the electrodes 14, 14a are distributed in a manner as shown in FIG. 9, and the electric field 17 can be prevented from concentrating upon the end portions 20 of the condenser elements. Such a construction is readily applicable to the case of using molding epoxy resin, polyester resin, or like resinous materials as the insulating material for the condenser body 3. This has particular advantage where a bushing may be produced by molding successive layers 4–7 of insulating resinous material one by one with the innermost layer 4 first molded, machining those portions of each molding layer corresponding to the end portions 20 of a field controlling electrode, or condenser element 14, 14a to be applied so as to make the same substantially parallel to the corresponding electrical equi-potential surfaces 17, and either subjecting the portion of the layer to which the electrode is applied, to metallic spraying, or applying a thin metallic foil to said portion of the layer.

Since the present invention eliminates the concentration of electrical field on the end portions 20 of the condenser elements 14, 14a the gradients of potential in the different insulating layers 4–7 become more uniform, resulting thereby in minimizing both the occurrence of a corona discharge, and the resulting deterioration of insulating characteristics of the bushing.

The foregoing construction permits a gradient of potential through the insulating condenser body 3 to be high and to use the insulating materials more effectively. As a result, therefore, the external outside diameter 25 (FIG. 1) of the finished terminal bushing 1 may be reduced, and the insulating materials may also be saved.

From the foregoing description, it will be apparent that the present invention contemplates not only a laminated condenser-type terminal bushing 1, in which the layers are successively molded about the central terminal stud, but, in addition, the present invention includes also the suitable configuration of the outer extremities 20 of the condenser elements 14, 14a so as to dispose them in substantially parallel relationship to the electric equi-potential surfaces 17, as shown in FIG. 9.

The result of the improved terminal-bushing construction of the present invention is that considerably less insulating material is employed, the external dimensions 25 of the completed terminal bushing 1 may be at a minimum; and, in addition, the potential gradient is reduced throughout the body 3 of the condenser bushing 1, and the insulating material is more effectively used.

Although there has been illustrated and described a particular type of condenser-type terminal bushing and a method for constructing the same, it is to be clearly understood that the same was merely for the purpose of illustration, and that changes and modifications may readily be made therein by those skilled in the art, without departing from the spirit and scope of the invention.

I claim as my invention:

1. The method of making a condenser-type terminal bushing comprising the steps of: molding and curing an inner insulating layer of synthetic resinous material to a terminal stud with the end portions of said layer being outwardly flared and thereby substantially parallel to the electrical equi-potential lines of the completed terminal bushing when in service, the end extremities of said layer also being finished and constituting portions of the external surface of the completed treminal bushing, applying a conducting layer to at least a portion of the external surface of said inner cured layer and spaced inwardly from the ends thereof, molding and curing a second inner insulating layer of synthetic resinous material completely about said conducting layer and over the same to form thereby finished end portions, and continuing like operations for the voltage level of the condenser-type terminal bushing until a laminated organic condenser body for the terminal bushing results.

2. The method of making a condenser-type terminal bushing as set forth in claim 1 with the additional step of finally securing an outer mounting-bushing flange to the outermost insulating layer.

References Cited in the file of this patent

UNITED STATES PATENTS

| | | |
|---|---|---|
| 1,230,610 | Sonneborn | June 19, 1917 |
| 1,526,023 | Steinberger | Feb. 10, 1925 |
| 2,915,678 | Frazier et al. | Dec. 1, 1959 |
| 2,945,913 | Conangla | July 19, 1960 |
| 2,953,629 | Lapp | Sept. 20, 1960 |

FOREIGN PATENTS

| | | |
|---|---|---|
| 320,903 | Switzerland | May 31, 1957 |
| 309,884 | Great Britain | Apr. 16, 1929 |
| 772,054 | Great Britain | Apr. 10, 1957 |
| 1,226,099 | France | Feb. 22, 1960 |